United States Patent
Berger

[11] 3,903,082
[45] Sept. 2, 1975

[54] AMINO-FUNCTIONAL SILICONE COMPOUNDS

[75] Inventor: Abe Berger, Schenectady, N.Y.

[73] Assignee: General Electric Company, Waterford, N.Y.

[22] Filed: Oct. 23, 1973

[21] Appl. No.: 408,271

Related U.S. Application Data

[63] Continuation of Ser. No. 174,165, Aug. 23, 1971, Pat. No. 3,801,572.

[52] U.S. Cl.. 260/243 R; 260/293.89; 260/448.2 B; 106/3; 252/184; 210/54
[51] Int. Cl.² ............... C07D 279/12; C07D 211/06
[58] Field of Search......... 260/243 R, 293.9, 293.89

[56] References Cited
UNITED STATES PATENTS
3,770,732  11/1973  Quinlan .......................... 260/243

*Primary Examiner*—John M. Ford
*Attorney, Agent, or Firm*—Donald J. Voss, Esq.; E. Philip Koltos, Esq.; Frank L. Neuhauser, Esq,

[57] ABSTRACT

A novel class of silicone compounds of the formula,

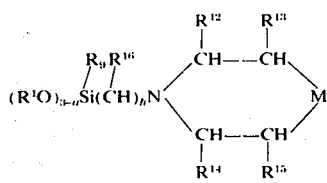

wherein $R$, $R^1$, $R^{16}$, $R^{12}$, $R^{13}$, $R^{14}$ and $R^{15}$ are selected from hydrogen and hydrocarbon radicals, while M is selected from sulfone and ketone groups, $h$ is a whole number that varies from 2 to 20 and $a$ is a whole number that varies from 0 to 2. This novel class of compounds are useful as flocculents for colloidal organic matter, as ingredients for detergent resistant polishes and as bonding agents for bonding various plastic resins and rubber to glass fibers and other types of glass material.

4 Claims, No Drawings

AMINO-FUNCTIONAL SILICONE COMPOUNDS

This application is a continuation of application Ser. No. 174,165, filed Aug. 23, 1971, now U.S. Pat. No. 3,801,572.

BACKGROUND OF THE INVENTION

The present invention relates to a novel class of silicone compounds and, in particular, the present invention relates to a novel class of silicone compounds having an amino-functional group attached to the silicon atom, where the amino-functional group has joined thereon a sulfone or ketone radical.

In various processes in industry, there are formed suspensions of colloidal matter in water and, during the process, it is necessary to precipitate this colloidal matter. In order to do this, various flocculating agents are used. Presently, a great amount of research and development has been carried out in the purification of sewage and other types of water containing waste organic matter. During the purification of this type of water, it is necessary to precipitate out of the water suspended colloidal organic matter. Various flocculating agents have been used for such precipitation purposes with various amount of success. In particular, there are four types of flocculating atents, that is the colloidal hydroxides of polyvalent metals, anionic, nonionic and cationic polyelectrolytes. Of these four classes of types of flocculating agents, the ones that have been found to be the most efficient in flocculating suspended or colloidal organic matter have been cationic polyelectrolytes.

Thus, present research is being carried out to find the most efficient possible cationic polyelectrolytes useful in flocculating colloidal organic matter.

In addition, silica sol or silicic acid has been used as a flocculating agent for colloidal organic matter but this material was only of limited efficiency. It is desirable to develop a novel composition which can be mixed with the silica sol for the purpose of forming a composition which is very efficient in flocculating colloidal organic matter.

In an ever more increasing rate, glass type of materials, and particularly glass fibers, are being used to form various manufactured items, wherein the glass type of materials are bonded to various synthetic rubbers, as well as natural rubber, and also to different types of plastic resins. In particular, it is desirable to utilize glass fibers, for instance in reinforcing rubber tires, and for other purposes so as to have a more durable article. For the production of such articles, such as glass fiber reinforced tires, it was necessary to develop bonding agents which would promote the bonding or adherence of the rubber or other plastic to the glass fiber or other type of glass material. Such bonding agents have been developed. However, it is desirable to produce novel compounds which will result in an even stronger and more efficient bond between the glass fibers and the rubber or plastic resin.

As is well known, polishes are used to polish various types of items and, particular, various types of polishes are used for the purpose of polishing or improving the appearance of paint on automobiles. Since such surfaces are exposed to strong detergents during washing, it is desirable to mix into the polish an ingredient which will permit the polished surface to resist the effect of strong detergents. Thus, there is a desire for a detergent resistent ingredient for incorporation into polishes of various types.

Thus, it is one object of the present invention to provide a novel class of silicone compounds.

It is yet another object of the present invention to provide a novel process for producing a novel class of silicone compounds.

It is still another object of the present invention to provide a novel class of silicone compounds which are efficient flocculating agents in precipitating organic colloidal matter from water.

It is yet another object of the present invention to provide a novel class of silicone compounds which are useful in bonding glass types of materials and particularly glass fibers to various rubbers and plastic resins.

It is an additional object of the present invention to provide a novel class of silicone compounds which are useful as detergent resistant ingredients in polishes.

These and other objects of the present invention are accomplished by means of the invention defined below.

SUMMARY OF THE INVENTION

In accordance with the present invention, there is provided a novel class of silicone compounds of the formula,

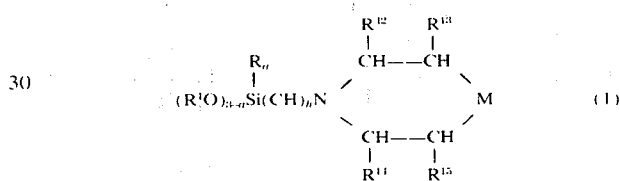

where R and R¹ are selected from the class consisting of monovalent hydrocarbon radicals and halogenated monovalent hydrocarbon radicals, $R^{12}$, $R^{13}$, $R^{14}$, $R^{15}$ and $R^{16}$ are selected from the class consisting of hydrogen, arlkyl radicals and aryl radicals of up to 10 carbon atoms, M is selected from the class consisting of $SO_2$ and C=O, $h$ is a whole number that varies from 1 to 20 and $a$ is a whole number that varies from 0 to 2.

Within the present invention there is also encompassed a novel class of silicone compounds of the formula,

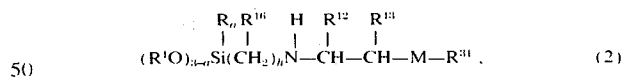

where R, $R^1$, $R^{12}$, $R^{13}$, $R^{16}$, M, $h$ and $a$ are as defined previously. The radical $R^{31}$ is selected from the class consisting of monovalent hydrocarbon radicals and halogenated monovalent hydrocarbon radicals. In the above formulas, it is desirable that the radicals R, $R^1$ are methyl and $R^{16}$, $R^{12}$, $R^{13}$, $R^{14}$ and $R^{15}$ are hydrogen. It is also preferable that $a$ be equal to 0.

DETAILED DESCRIPTION OF THE PREFERRED EMBODIMENT

In formulas (1) and (2) above, the radicals R, $R^1$ and $R^{31}$ are selected from the class consisting of monovalent hydrocarbon radicals and halogenated monovalent hydrocarbon radicals, such as alkyl radicals, e.g., methyl, ethyl, propyl, butyl, octyl, etc. radicals; aryl radicals, e.g., phenyl, naphthyl, tolyl, xylyl etc. radicals; aralkyl radicals, e.g., benzyl, phenylethyl, etc. radicals;

alkenyl radicals, e.g., vinyl, allyl, cyclohexenyl, etc. radicals; cycloalkyl radicals, e.g., cyclohexyl, cycloheptyl, etc. radicals; halogen-substituted monovalent hydrocarbon radicals, such as, for example, chlorophenyl, chloronaphthyl, dibromophenyl, etc. Preferably, the radicals R and $R^1$ and $R^{31}$ have no more than 10 carbon atoms, and more preferably, the radicals R and $R^1$ are alkyl radicals of 1 to 5 carbon atoms, such as methyl, ethyl, etc. The radical $R^{31}$ is preferably an alkyl radical or an alkenyl radical of 15 carbon atoms or less. More preferably, the radical $R^{31}$ is methyl, ethyl, propyl, etc. The radicals $R^{12}$, $R^{13}$, $R^{14}$ and $R^{15}$, as well as $R^{16}$, are independently selected from the class consisting of hydrogen, alkyl radicals and aryl radicals. Preferably, these radicals are of 10 carbon atoms or less and, more preferably, these radicals are hydrogen or lower alkyl radicals, such as methyl, ethyl, propyl, butyl, etc. Within the scope of formulas (1 and (2), $h$ is a whole number that varies from 1 to 20 and is preferably 10 or less. The symbol $a$ is a whole number that varies from 0 to 2 and is preferably 0. One of the more preferred compounds within the scope of formula (1) has the formula,

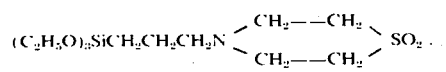

Preferred compounds coming within the scope of both formula (1) and formula (2) are as follows:

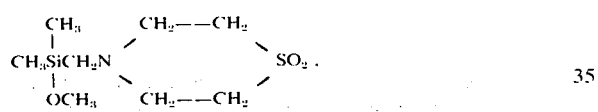

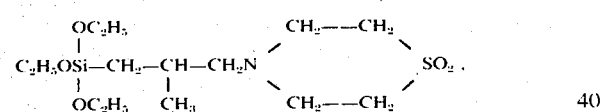

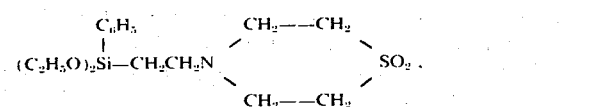

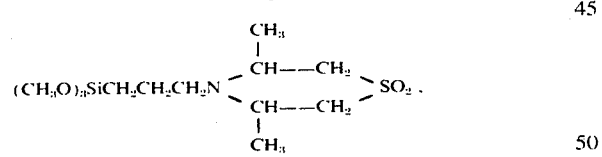

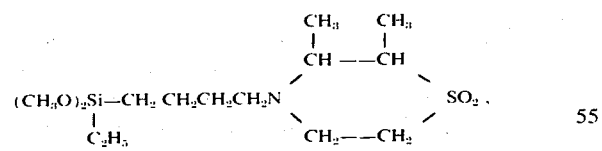

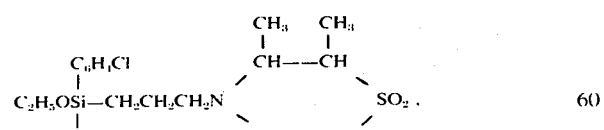

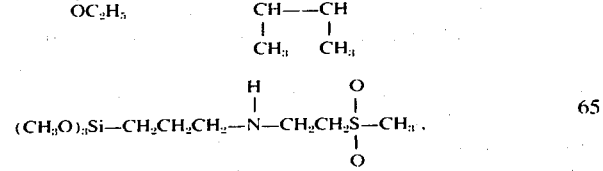

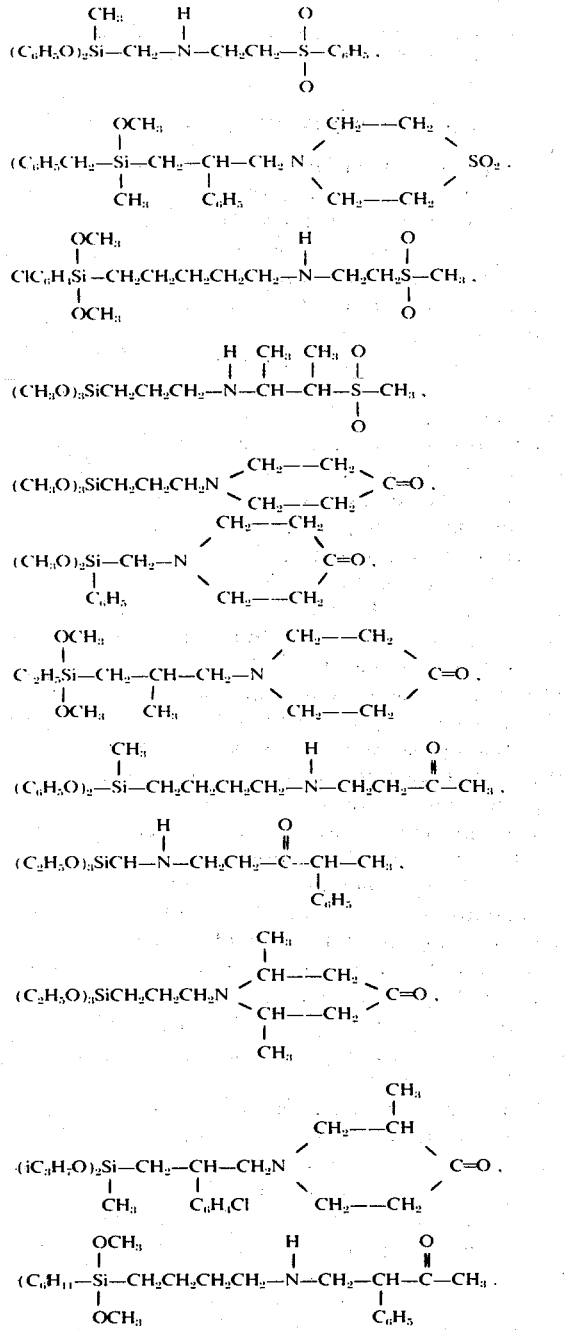

The compound of formula (1) is produced by reacting a compound of the formula,

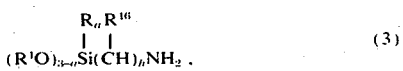

with a compound of the formula,

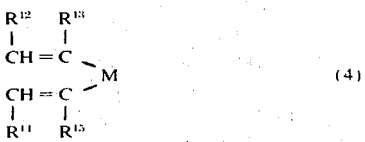

where the symbols R, R¹, R¹², R¹³, R¹⁴, R¹⁵, R¹⁶ and M and the whole numbers h, a are as defined previously. The compounds of formulas (3) and (4) are preferably reacted together in stoichiometric proportions. Although excesses of either compound may be used in the reaction, no advantage is gained by using such an excess. A solvent is not necessary in the reaction, although common inert hydrocarbon solvents may be used such as xylene, toluene, mineral spirits, benzene and cyclohexane, as well as the common alkanol or ether solvents.

The reaction is preferably carried out at a temperature range of 50° to 150°C and, preferably, at a temperature range of 60° to 120°C. A yield of 70 to 90% is obtained at this temperature range if the reaction is allowed to proceed anywhere from 4 to 8 hours. No catalyst is necessary in this reaction and the reaction proceeds without any difficulty at the elevated temperature range.

If desired, a basic catalyst may be used, such as sodium methoxide, Triton B, sodium amide, sodium hydroxide, trisodium phosphate, Rexan 201, tetramethylethylenediamine, triethylphosphine, triphenylphosphine, etc. It must be understood that such a basic catalyst is not necessary. In the event such catalyst is used, it should be used in the amount of 0.5 to 5% by weight of the reactants of formulas (3) and (4). It is desired that the acid type of catalyst not be used in this reaction since they will react with the amine group of the compound of formula (3) and thereby form byproducts other than the desired product of formula (1).

The compound of formula (2) above is formed by reacting the compound of formula (3) with a compound of the formula,

(5)

In the above formula (5), the radicals R¹², R¹³, R³¹ and M are as previously defined. The reaction of the compounds of formula (3) with the compound of formula (5) takes place under the same conditions and the same type of catalyst, although a catalyst is not necessary as described above with respect to the reaction of the compounds of formulas (3) and (4). In addition, the yield obtained and the reaction between the compounds of formulas (3) and (5) to yield a compound of formula (2) is the same as the previous reaction. The compound of formula (3) above is obtained by reacting a compound of the formula,

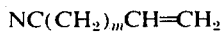

(6)

with a compound of the formula,

(7)

In formula (6) above, m is a whole number that varies from 0 to 18, R and a are as previously defined, and Z is a halogen, preferably chlorine. The compounds of formulas (6) and (7) are well known compounds in the art and are readily available. The compound of formula (7) is manufactured by most commercial producers of silicone compounds, while the compound of formula (6) is sold commercially by Vistron, American Cyanamide (acrylonitrile), Aldrich, Robers, Kay Fries (allyl cyanide), etc. In the case where m is equal to 0, a catalyst system must be used, such as that defined in Bluestein U.S. Pat. No. 2,971,970. Such a catalyst system may comprise, for instance, a mixture of tributylamine, N,N,N'-N'-tetramethylethylenediamine and cuprous chloride. These components may be present in equal proportions wherein the total catalyst mixture comprises from 1 to 5% by weight of the two reactants of formula (6) and formula (7). This reaction may take place anywhere from room temperature and, preferably, in the range of 50° to 150°C. Although a solvent is not necessary, any of the common inert hydrocarbon solvents may be used. The yield from this reaction is roughly, under the conditions specified above and in the catalyst system specified above, from 60 to 80% in a reaction period of 4 to 8 hours. For further details as to the above reaction, one is referred to the above Bluestein patent whose disclosure is incorporated into this specification by reference.

It should be noted that in place of the above Bluestein catalyst system, in the case where m is equal to 0 in formula (6), there may be used other basic catalysts such as triphenylphosphine, dimethylformamide, tributylamine, and triethylphosphine. Such catalysts may be used in a concentration of 1 to 5% and, preferably, 1 to 3% by weight of the two reactants of formulas (6) and (7). However, the catalyst system particularly in the Bluestein patent mentioned above, is preferred since the higher yields are obtained with that type of catalyst system in the reaction conditions disclosed therein.

In the case where m is equal to 1 and greater, then the reaction of the compounds of formula (6) and formula (7) must take place in the presence of a platinum catalyst.

The platinum compound catalyst can be selected from the group of platinum compound catalysts which are operative to catalyze the addition of silicon-hydrogen bonds across olefinic bonds. Among the many useful catalysts for this addition reaction are chloroplatinic acid as described in U.S. Pat. No. 2,823,218 — Speier et al., the reaction product of chloroplatinic acid with either an alcohol, an ether or an aldehyde as described in U.S. Pat. No. 3,220,972 — Lamoreaux, trimethylplatinumiodide and hexamethyldiplatinum as described in U.S. Pat. No. 3,313,773 — Lamoreaux, the platinum-olefin complex catalyst as described in U.S. Pat. No. 3,159,601 — Ashby and the platinum cyclopropane complex catalyst described in U.S. Pat. No. 3,159,662 — Ashby. In this platinum catalyzed reaction, a solvent may or may not be used although the solvent permits more intimate contact between the reactants. The SiH-olefin addition reaction may be run at room temperature or temperatures up to 200°C, depending on catalyst concentration. The catalyst concentration can vary from $10^{-7}$ to $10^{-3}$ and, preferably, $10^{-5}$ to $10^{-4}$ mole of platinum as metal per mole of olefinic-containing molecules present. Preferably, the reaction is run at a temperature range of 25° to 100°C with the reactants dissolved in one of the common inert hydrocarbon solvents. The reaction is allowed to proceed for 2 to 6 hours with a yield of the desired product being obtained of 60 to 80%. The resulting product which still has halogen groups thereon, is then taken and placed through an alcoholysis reaction, that is, the compound is reacted with an alcohol such as R'OH or an orthoformate such as triethylorthoformate or trimethylorthoformate of the generic formula (R'O)$_3$CH, where R' is as defined previously and is preferably methyl or ethyl. This type of reaction substitutes the halogen atoms attached to silicon with alkoxy and aryloxy groups. The reaction with the alcohol is the well known type of alcoholysis reaction which is preferably carried out in the temperature range of 50° to 120°C. Preferably, a solvent is not used in the case where the orthoformate is used. However, when the alcohol is used, it is desirable to use a solvent such as xylene, or toluene, in which the hydrogen chloride that is produced as a result of the reaction is not soluble. If a solvent is not used in this alcoholysis reaction in which the hydrogen chloride byproduct is not soluble, then a hydrogen chloride acceptor may be used as a solvent in the reaction mixture so as to absorb the HCl that is formed. An example of such a hydrogen chloride acceptor is tributylamine.

Another way of removing the HCl that is formed in this alcoholysis reaction is to let the reaction proceed under vacuum, such as having a vacuum of 20 mm of mercury or more, so as to remove the HCl that is formed. When the orthoformate is used, no HCl is formed and the HCl acceptor is not necessary.

As a result of this alcoholysis reaction, there is obtained a product of the formula,

(8)

This compound of formula (8) can now be hydrogenated to change the nitrile group to an amine group. The compound of formula (8) is mixed with hydrogen gas and, preferably, an excess of hydrogen gas is used to provide sufficient pressure for the reaction to proceed at a desirable rate. It has been found convenient to employ the hydrogen reactant in an amount of from about 2 to about 20 chemical equivalents of the nitrile compound of formula (8).

In the reaction there may be used inert hydrocarbon solvents or the well known alkanol solvents and the aromatic hydrocarbon solvents as, for example, benzene, tolyene, etc. In addition, there is preferred as the catalyst system, Raney nickel and Raney cobalt, as well as certain cyclopentadienyl metals such as bis-cyclopentadienyl nickel. This catalyst is preferably used in a concentration of 0.1 to 5% by weight of the reactants. In addition to the nickel, there may be used ammonia for directing the reaction to the formation of principally primary amines. Thus, there may be used ammonia in the amount of about 20 moles of ammonia per mole of the nitrile compound so as to increase the yield of the primary amine product. The reaction is preferably carried out at temperatures as low as 80°C and at temperatures as high as 140°C with good results. Temperatures, for example, below 80° and above 140°C can be employed. However, no advantage is obtained thereby. Although the reaction may be carried out at low pressures, such as 20 to 100 psig, it is preferable that the reaction be carried out at a pressure of 500 to 1,000 psig. For more information as to this process and reaction, one is referred to U.S. Pat. No. 2,930,809, whose disclosure is incorporated into this specification by reference.

As a result of the hydrogenation of the compound of formula (8), the basic reactant, that is the compound of formula (3) above, is obtained. The other basic reactants, that is the compounds of formula (4) and formula (5) above, are compounds known in the art which are sold by such companies as Aldrich Chemical Company, Madison, Wis. and Eastman Kodak Company, Rochester, N.Y.

The compound of formula (4) may be synthesized by generally following the following synthesis procedure. In the first part of the synthesis, two compounds may be reacted in accordance with the following reaction:

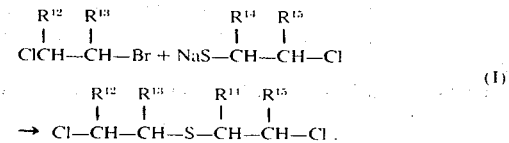

(I)

The two reactants in reaction I above are well known in the art and commercially sold by many manufacturing concerns. In reaction I above, a catalyst is not used. However, it is preferred that the reaction be carried out in the presence of a common hydrocarbon solvent such as benzene, toluene, xylene, as well as the ether solvents such as tetrahydrofuran. Reaction I above is the Williamson ether-type of synthesis. The reaction proceeds to completion to result in a yield of 80 to 90% in a reaction time of 2 to 5 hours. Proceeding with the synthesis, the reaction product of reaction I above is then taken and reacted with a peracid so as to oxidize the sulfur group to a sulfone group. This is a well known peracid oxidation. Examples of peracids that can be used are peracetic acid, metachloroperbenzoic acid, perphthalic acid, methylethylketone peroxide, as well as other such types of acids. Preferably, 2 or more moles of the peracid is used per mole of the reaction product of reaction I above. The reaction may be carried out at a temperature range of 0° to 75°C and, preferably, at a temperature range of 15° to 40°C in a reaction time of 1 to 4 hours to obtain a yield of 75 to 85%. The resulting sulfone product that is obtained is then isolated from the peracetic acid after excess peracid id destroyed by distillation or other means and then taken and dissolved in one of the common inert hydrocarbon solvents or, more preferably, a solvent such as dimethylformamide and particularly ether solvents such as tetrahydrofuran. To the resulting solution there is then added a basic reagent in a concentration of 2 molar equivalents and, preferably, an excess of 25 molar per cent. The base used may be any type of basic dehydrohalogenation agents such as sodium hydroxide, sodium carbonate, a tertiary amine, any of the tertiary amines such as tributylamine, 1,5-diazobicyclo[430]non-5-ine, etc. In the presence of such types of dehydrohalogenating agents and at a temperature ranging from 0° to 100°C and preferably 15° to 40°C, there is obtained from the resulting reaction the compound of formula (4), where M is equal to a sulfone group. This reaction takes place in the preferred temperature range indicated above with a basic dehydrohalogenating agent in 2 to 6 hours with a yield of 80 to 90%. Where M is equal to a ketone group in formula (4), the compound is available from the manufacturers indicated above. One manner by which such a compound may be synthesized is by the initial reaction of,

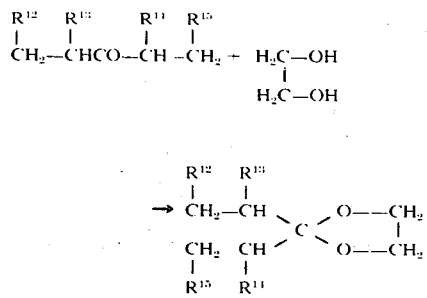

The two reactants indicated in reaction II above are well known compounds which are commercially available. This reaction is preferably carried out in the presence of .5% to 4% acid catalyst and, preferably, 1 to 2% by weight of the reactants. The acid catalyst may be selected from many strong acids, such as hydrochloric, nitric and toluene sulfonic acids. This reaction is preferably carried out at room temperature but may be carried out at any temperature within the range of 20° to 100°C. The reactants are preferably dissolved in one of the common inert hydrocarbon solvents or ether solvents, examples of which have been given above. The reaction may be carried out at reflux, that is, at the reflux temperature of the solvent to continually azeotrope out the water that is formed during the reaction. The reaction product of reaction II above is then taken and chlorine gas is passed through the compound in the presence of ultraviolet rays which acts as a catalyst. The reaction may be carried out at room temperature and, in fact, at any temperature of from 20° to 100°C. More preferably, the reaction is carried out at a temperature range of 20° to 50°C.

The reaction product of reaction II above is preferably dissolved in one of the common inert solvents as mentioned previously, so as to facilitate the bubbling or passing of the $Cl_2$ gas in contact with this compound. The resulting dichlorinated product is then taken and for 1 mole of such product there is reacted with it at least 2 moles of a strong basic catalyst, such as sodium hydroxide, potassium hydroxide or a tertiary amine such as tripropylamine, tributylamine, etc. This reaction with the basic reagent is preferably carried out with the chlorinated compound dissolved in an ether solvent, such as tetrahydrofuran. The reaction may be carried out at any temperature in the range of 0° to 100°C and is preferably carried out at 15° to 40°C. The conditions of the reaction are much the same type of reaction as used previously in the synthesis of a compound of formula (4) wherein (4) is equal to a sulfone group. In other words, this is a dehydrohalogenation reaction in the presence of a dehydrohalogenating agent such as sodium hydroxide, potassium hydroxide and the other basic catalysts disclosed above.

The diolefin compound which is the reaction product of this reaction is obtained in a yield of 60 to 80% in a reaction time of 2 to 6 hours. This diolefin compound may then be taken and reacted with a catalytic amount of an acid such as acetic acid, sulfuric acid, toluene, sulfonic acid, etc., in order to restore the ketone group in the compound. This acidification with one of the strong acids, some examples of which are given above, takes place in the presence of water and any type of common hydrocarbon solvent and, in particular, the common hydrocarbon solvents disclosed above. Preferably, the reaction is carried out at the reflux temperature of the solvent such as anywhere from 50° to 100°C, although the reaction may take place at an even higher temperature if higher boiling solvents are present. This reaction usually takes place at the temperatures indicated in the time of 1 to 3 hours with yields of 70 to 80%.

The compounds within the scope of formula (5) are sold commercially by the same companies as those that are indicated to sell commercially the compounds of formula (4). In addition, it is obvious that such compounds within the scope of formula (5) may be produced by synthesis similar to the ones indicated for producing the compounds within the scope of formula (4).

The following examples are given for the purpose of illustrating the invention but are not intended to limit the scope of the invention in any way.

EXAMPLE 1

To a reaction mixture containing 44.2 g γ-aminopropyltriethoxysilane (0.2 mole) there is added slowly 23.6 g divinylsulfone (0.2 mole). A vigorous reaction occurs and the reaction temperature rises to 75°C. By controlling the rate of addition, the reaction is kept at 70° ± 10°C. After complete addition, the reaction is kept at 80°C for an additional 3 hours. A vapor phase chromatography analysis shows a high conversion to a high boiling adduct with very little starting material present. Upon fractionation, the product distilled over at 186°–188°C at 0.9 mm pressure and there is obtained 55 g of product. A vapor phase chromatographic analysis showed a purity of about 98%. An infrared scan shows a sulfone absorption at 7.25μ and 8.6μ. The absorption bands at 2.9μ and 6.3μ present in the amine starting material is absent in the final product. The product has the formula,

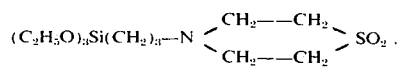

EXAMPLE 2

To a reaction mixture containing a solution of 21.2 g methylvinylsulfone in 50 parts of tetrahydrofuran is added dropwise at 32°C, 36 g γ-aminopropyltrimethoxysilane. An exothermic reaction ensues. The reaction is run at 32°–45°C by controlling rate of silane addition. Following complete addition, the reaction is heated to reflux at 68°C and held there for 4 hours. In examining the product by gas chromatography, a high boiling adduct is shown to be present. The product is distilled and isolated. Its identification is confirmed by infrared and nuclear magnetic resonance spectroscopy and is in agreement with the formula of,

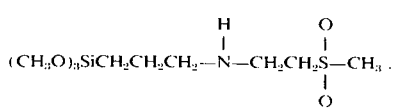

EXAMPLE 3

To a reaction mixture containing 19.1 parts γ-aminopropyldiethoxymethylsilane in 75 parts toluene is added with cooling 8.2 g divinylketone. The reaction is exothermic and in order to avoid secondary reaction of primary amine with the carbonyl group, the reaction is kept at 10°–15°C with slow ketone addition. Following complete addition (2 hours), the reaction is allowed to warm to room temperature and stirred for 1 hour and then heated to 70°C for an additional 2 hours. Upon fractionation, the product is isolated and its structure is confirmed by infrared and nuclear magnetic resonance spectroscopy as,

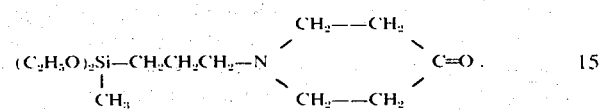

EXAMPLE 4

Similar to the procedure shown in Example 1, the addition of 19.1 parts aminomethyltriethoxysilane to 12.8 parts divinylsulfone at ambient temperature followed by a heating period at 70°C for 2 hours forms the adduct,

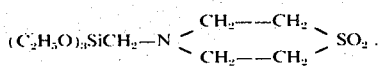

This product is purified by distillation and its structure is confirmed by infrared and nuclear magnetic resonance spectroscopy.

EXAMPLE 5

The slow addition of 2-methyl,4-aminobutyldimethylethoxysilane to an equimolar amount of phenylvinylsulfone dissolved in tetrahydrofuran produces an exotherm, following which in accordance with conventional procedure can be isolated to a product of the following structure,

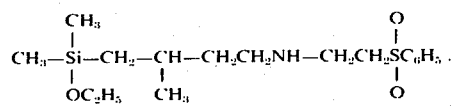

This structure is confirmed by infrared and nuclear magnetic resonance spectroscopy.

I claim:

1. A method for producing a silicone compound of the formula,

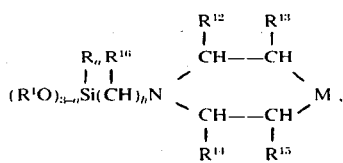

comprising reacting a compound of the formula, $$(R^1O)_{3-a}Si(CH)_hNH_2$$
$$R_a, R^{16}$$

with a compound of the formula,

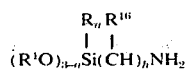

where R and $R^1$ are alkyl radicals of 1 to 5 carbon atoms, $R^{12}$, $R^{13}$, $R^{14}$, $R^{15}$ and $R^{16}$ are selected from the class consisting of hydrogen and alkyl radicals of up to 10 carbon atoms, M is selected from the class consisting of $SO_2$ and

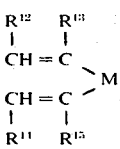

$h$ is a whole number that varies from 1 to 10 and $a$ is a whole number that varies from 0 to 2.

2. The method of claim 1 wherein the reactants are reacted in a 1 to 1 mole ratio.

3. The method of claim 1 wherein the reaction is maintained at a temperature of 60°–120°C.

4. The method of claim 1 wherein the reaction takes place in a hydrocarbon solvent selected from the class consisting of toluene, xylene, cyclohexane, mineral spirits and acetone.

* * * * *